(12) United States Patent
Stanton

(10) Patent No.: US 8,342,598 B2
(45) Date of Patent: Jan. 1, 2013

(54) STRUCTURE INCLUDING A COMPOSITE PANEL JOINT

(75) Inventor: William H. Stanton, Winnipeg (CA)

(73) Assignee: Faroex Ltd., Gimilli, MB (CA)

(*) Notice: Subject to any disclaimer, the term of this patent is extended or adjusted under 35 U.S.C. 154(b) by 250 days.

(21) Appl. No.: 12/626,668

(22) Filed: Nov. 26, 2009

(65) Prior Publication Data

US 2011/0121610 A1    May 26, 2011

(51) Int. Cl.
    *B60R 13/04* (2006.01)
(52) U.S. Cl. ...................................................... 296/191
(58) Field of Classification Search .............. 296/191, 296/187.01, 193.01, 203.01, 203.03, 29; 156/60, 92, 295; 428/118; 29/428, 469; 312/140, 263
    See application file for complete search history.

(56) References Cited

U.S. PATENT DOCUMENTS

| | | | | |
|---|---|---|---|---|
| 4,222,606 A * | 9/1980 | Brown et al. | ............... | 296/186.1 |
| 4,878,329 A * | 11/1989 | Pawski | ............... | 52/245 |
| 5,041,318 A * | 8/1991 | Hulls | ............... | 428/57 |
| 5,042,395 A | 8/1991 | Wackerle | | |
| 5,140,913 A * | 8/1992 | Takeichi et al. | ............... | 105/397 |
| 5,187,913 A * | 2/1993 | Leveau | ............... | 52/584.1 |
| 5,338,080 A * | 8/1994 | Janotik et al. | ............... | 296/29 |
| 5,343,666 A * | 9/1994 | Haddad et al. | ............... | 52/648.1 |
| 5,403,062 A * | 4/1995 | Sjostedt et al. | ............... | 296/181.3 |
| 5,403,063 A * | 4/1995 | Sjostedt et al. | ............ | 296/193.07 |
| 5,449,081 A * | 9/1995 | Sjostedt et al. | ............... | 220/1.5 |
| 5,472,290 A * | 12/1995 | Hulls | ............... | 403/393 |
| 5,497,589 A * | 3/1996 | Porter | ............... | 52/309.7 |
| 5,741,042 A * | 4/1998 | Livingston et al. | ...... | 296/203.01 |
| 5,791,726 A * | 8/1998 | Kaufman | ............... | 296/182.1 |
| 5,860,693 A * | 1/1999 | Ehrlich | ............... | 296/191 |
| 5,938,274 A * | 8/1999 | Ehrlich | ............... | 296/191 |
| 5,997,076 A * | 12/1999 | Ehrlich | ............... | 296/186.1 |
| 6,068,424 A * | 5/2000 | Wycech | ............... | 403/269 |
| 6,220,651 B1 * | 4/2001 | Ehrlich | ............... | 296/186.1 |
| 6,224,142 B1 * | 5/2001 | McCormack | ............... | 296/191 |
| 6,375,249 B1 | 4/2002 | Stanton | | |
| 6,412,854 B2 * | 7/2002 | Ehrlich | ............... | 296/191 |
| 6,421,979 B1 * | 7/2002 | Fischer et al. | ............. | 52/745.19 |
| 6,474,726 B1 * | 11/2002 | Hanakawa et al. | ........... | 296/191 |
| 6,578,902 B2 * | 6/2003 | Sill | ............... | 296/186.1 |
| 6,749,254 B1 * | 6/2004 | Kleven et al. | ................. | 296/191 |
| 6,793,271 B1 * | 9/2004 | Deets | ........................ | 296/182.1 |

(Continued)

FOREIGN PATENT DOCUMENTS

WO    WO 2007/056840    5/2007

*Primary Examiner* — Kiran B Patel
(74) *Attorney, Agent, or Firm* — Adrian D. Battison; Ade & Company Inc

(57) ABSTRACT

A panel formed by resin infusion from two fiber reinforced resin layers and a separating core is connected to a member such as a metal rail or another panel by an adhesive joint. The panel edge is shaped to define a male portion with a web and two side portions and the rail is channel shaped to match. A layer of adhesive of a thickness not less than 0.03" or more than 0.10" covers the base and sides. The tapered shape allows the adhesive located between the web of the panel and the web of the member, between the flange of the panel and the surface of the member and between the flange of the member and the second surface of the panel to be simultaneously compressed without the necessity for any shearing in the adhesive layer.

5 Claims, 4 Drawing Sheets

U.S. PATENT DOCUMENTS

| | | | |
|---|---|---|---|
| 6,942,915 B1 * | 9/2005 | Kondo et al. | 428/174 |
| 7,225,852 B2 * | 6/2007 | McConnell et al. | 160/351 |
| 7,228,805 B2 * | 6/2007 | Beers et al. | 105/423 |
| 7,267,393 B2 * | 9/2007 | Booher | 296/182.1 |
| 7,296,846 B2 * | 11/2007 | Booher | 296/186.1 |
| 7,305,923 B2 * | 12/2007 | Creighton et al. | 105/404 |
| 7,316,444 B2 * | 1/2008 | Montagna et al. | 296/100.02 |
| 7,334,697 B2 * | 2/2008 | Myers et al. | 220/1.5 |
| 7,338,111 B2 * | 3/2008 | Lemmons | 296/186.1 |
| 7,390,053 B2 * | 6/2008 | Booher | 296/186.1 |
| 7,475,965 B2 * | 1/2009 | Silverbrook | 347/54 |
| 7,478,600 B2 * | 1/2009 | Beers et al. | 105/423 |
| 7,494,177 B2 * | 2/2009 | Henning | 296/186.1 |
| 7,530,623 B2 * | 5/2009 | Hampel | 296/146.11 |
| 7,588,286 B2 * | 9/2009 | Lewallen et al. | 296/186.1 |
| 7,621,589 B1 * | 11/2009 | Gerome | 296/186.1 |
| 7,677,642 B2 * | 3/2010 | Wylezinski | 296/186.1 |
| 7,762,617 B2 * | 7/2010 | Booher | 296/184.1 |
| 7,762,618 B2 * | 7/2010 | Lewallen et al. | 296/186.1 |
| 7,770,345 B2 * | 8/2010 | McConnell et al. | 52/263 |
| 7,790,076 B2 * | 9/2010 | Seiter et al. | 264/41 |
| 7,862,103 B2 * | 1/2011 | Riley et al. | 296/186.1 |
| 7,901,537 B2 * | 3/2011 | Jones et al. | 156/289 |
| 2002/0109377 A1 * | 8/2002 | Ehrlich | 296/191 |
| 2007/0132278 A1 * | 6/2007 | Lester et al. | 296/191 |
| 2010/0314909 A1 * | 12/2010 | Fuchs et al. | 296/191 |

* cited by examiner

US 8,342,598 B2

STRUCTURE INCLUDING A COMPOSITE PANEL JOINT

This invention relates to a structure including a composite panel which is connected to a next adjacent member by a joint.

BACKGROUND OF THE INVENTION

The following patents have been noted as having some relevance in the present field U.S. Pat. No. 5,042,395 (Wackerle) issued Aug. 27, 1991 discloses a rail vehicle formed from molded upper section defining the side walls and roof connected to a floor section. The connection is provided by a corner piece which is bonded into an edge piece at each edge of each molded composite panel. The composite panels are formed from exterior sheets with a honey comb core between.

U.S. Pat. No. 6,375,249 (Stanton) issued Apr. 23, 2002 discloses a body structure of a mass transit vehicle where a sandwich floor panel is applied over a vehicle frame including transverse rails and side rails and is attached to the side rails.

PCT published Application 2007/056840 (Stanton et al) published May 24, 2007 discloses a vehicle construction using sandwich panels for the floor, sidewalls and roof where a number of different joint connections are shown.

U.S. Pat. No. 5,403,062 (Sjostedt) issued Apr. 4, 1995 discloses an adhesive panel joint where a tongue portion along one panel edge engages into a channel along a panel edge of a second panel where the side walls of the tongue and channel are slightly tapered.

SUMMARY OF THE INVENTION

It is one object of the invention to provide a joint between two components of an assembled structure.

According to a first aspect of the invention there is provided an assembled structure comprising:

a panel having a first surface, a second surface and an edge;

the panel being formed by a resin infusion from a first fiber reinforced resin layer at the first surface and a second fiber reinforced resin layer at the second surface and containing therebetween a core material and together defining an integral resin infused structure;

a member connected by adhesive to the panel along the edge of the panel;

the panel being shaped at the edge of the panel to define a web formed from a fiber reinforced resin layer interconnecting the first surface and the second surface and extending along the edge;

the panel being shaped at the first and second surfaces along the edge of the panel to define a portion of each of the first and second surfaces along the edge which is tapered at an angle inwardly such that a width of the web at the edge is less than a space between the first and second surfaces at positions thereon spaced from the edge;

the member being shaped at the edge of the panel to define channel containing the web and the portions of the first and second surfaces therein and including a base of the channel adhesively attached to the web, a first side wall of the channel adhesively attached to the tapered portion of the first surface and a second side wall of the channel adhesively attached to the tapered portion of the second surface;

wherein the first and second side walls are tapered at an angle matching that of the angle of the portions of the first and second surfaces;

and a layer of adhesive covering the web and covering those parts of the portions contacting the side walls and thereby attaching the web to the base and the portions to the side walls;

wherein the adhesive has a thickness not less than 0.03" (1 mm) or more than 0.10" (2.5 mm).

In one example, the member comprises a rail of metal or other structural alternatives metal.

In another example, the member comprises a second panel formed by a resin infusion from a first fiber reinforced resin layer at the first surface and a second fiber reinforced resin layer at the second surface and containing therebetween a core material and together defining an integral resin infused structure, the second panel having the channel therein from a fiber reinforced resin layer.

Preferably the arrangement is such that adhesive located between the web of the panel and the web of the member, between the flange of the panel and the surface of the member and between the flange of the member and the second surface of the panel is simultaneously compressed without the necessity for any sliding action.

Preferably the adhesive is arranged such that the adhesive releases its bond by heating to a release temperature such that the panel can be separated from the member by heating the adhesive to its release temperature.

In one example, the panel forms a panel of a body of a vehicle, in which case the member can form a stiffening rail of the body of the vehicle.

Preferably the adhesive is a adhesive with a cross-linking, reactive chemistry in which structural integrity of the adhesive is dependent on even distribution of the adhesive between the interfacing elements of the structure by means of compression such as catalyzed methyl methacrylate.

Preferably the angle of taper of each of the portions relative to the respective surface is not less than 10 degrees.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
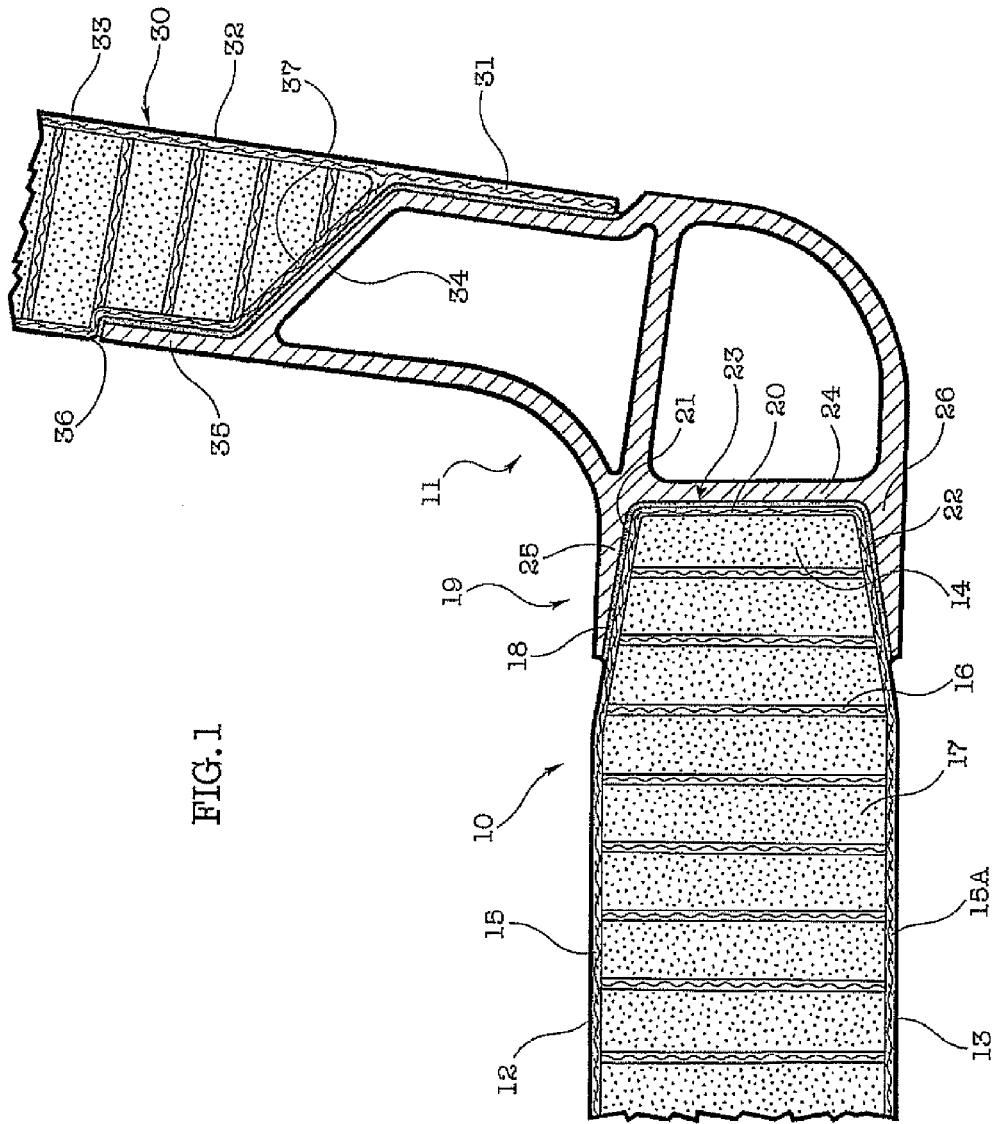
FIG. 1 is a transverse cross sectional view of the side section and floor section of a vehicle showing a joint according to the present invention.
Figure 2:
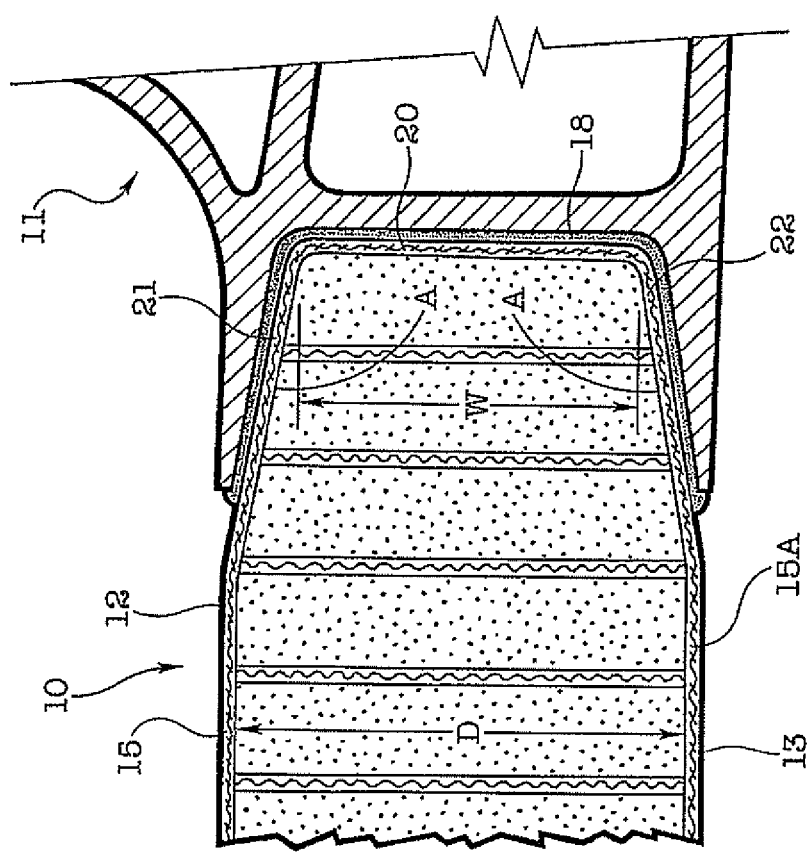
FIG. 2 is a cross sectional view on an enlarged scale of the joint of FIG. 1 showing the joint between a panel and a rail.

FIGS. 1 and 2 show an assembled structure defined by a panel 10 and an attached rail 11 and the joint therebetween.

The panel has an outer surface 12, of a wall 15, an outer surface 13 of a second wall 15A and an outer surface 20A of an end wall 20 at an edge 14 of the panel 10. The remaining parts of the panel are not shown or described since these can be of any suitable constructions and many typical arrangements are available.

The panel is formed by a resin infusion or by other techniques known to persons skilled in this art to define an integral construction formed from a first fiber reinforced resin wall 15 at the first surface 12 and a second fiber reinforced resin wall 15A at the second surface and containing therebetween a core material 16 and together defining an integral resin infused structure. The core can be of foam, balsa wood, honeycomb material 16A which may contain an injected foam 17, or other materials used on this type of sandwich panel.

The rail 11 is connected by adhesive 18 at a joint 19 to the panel along the edge 14 of the panel. The panel is shaped at the edge 14 to define a tongue portion at the edge 14 including the end wall 20 also formed from a fiber reinforced resin wall similar to the layers 15 and 15A and interconnecting the first surface 12 and the second surface 13 and extending along the edge 14. The panel also is shaped to define a portion 21, 22 of each of the first and second walls 15, 15A along the edge 14 which is tapered at an angle inwardly such that a width W of the end wall 20 at the edge 14 is less than a width D between the first and second surfaces 12, 13 at positions thereon spaced from the edge. The angle of taper is indicated at A and is greater than or equal to 10 degrees.

The rail 11 is shaped at the edge of the panel to define channel 23 containing the end wall 20 and the portions 21, 22 therein. In the assembled joint the parts include a base 24 of the channel adhesively attached to the end wall 20, a first side wall 25 of the channel adhesively attached to the tapered portion 21 of the first wall 15 and a second side wall 26 of the channel adhesively attached to the tapered portion of the second wall 15A.

The end wall 20 has a width matching that of the base 24 and the first and second side walls 25, 26 are tapered at an angle matching that of the angle of the portions 21, 22 of the first and second walls 15, 15A. This provides when the tongue portion of the panel is inserted into the channel of the rail ad constant thickness of a space between the components so as to define when inserted a layer of adhesive 18 covering the end wall and covering those parts of the portions contacting the side walls and thereby attaching the web to the base and the portions to the side walls. The adhesive has a thickness not less than 0.03 inch (1 mm) or more than 0.10 inch (2.5 mm). This is obtained by providing in the adhesive a filler material defined by glass beads of 0.03 inch diameter which prevent the adhesive being compressed to a thickness less than this value. The thickness of the adhesive is preferably at or close to this minimum which this provides the most effective adhesive action my minimizing the thickness to minimize shearing forces in the adhesive. However the thickness can be greater, up to 0.10 inch which provides a maximum value due to the increased shearing of the adhesive under twisting loads in the joint. The thickness is preferably constant which is obtained by compressing the parts together until the minimum thickness is required with the dimensions of the components matched such that, at this minimum location the base and end wall are separated by the required distance and the sides and the portions are separated by the same distance. Thus the components do not act as a compression or friction fit by a wedging action between the portions and the side walls but instead all three pairs of cooperating surfaces are brought together simultaneously.

Figure 3:
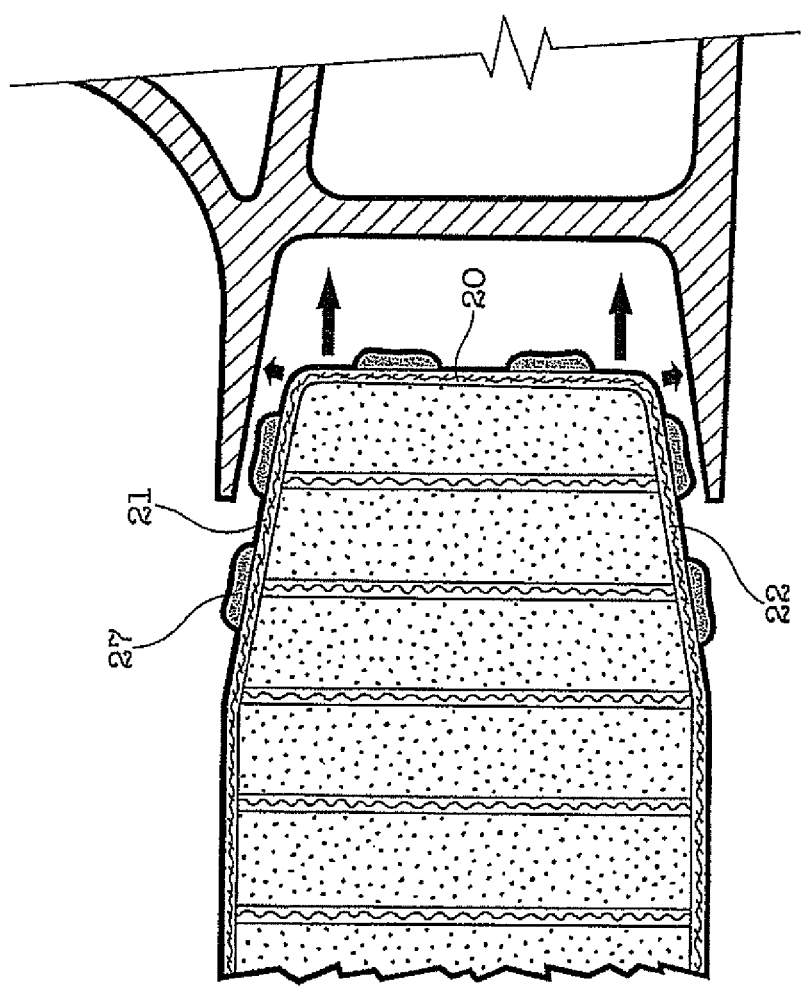
FIG. 3 is a cross sectional view on an enlarged scale of the joint of FIG. 1 showing the components of the joint prior to assembly.

As shown in FIG. 3, the adhesive is applied as one or more beads 27 on the surfaces of the portions 21, 22 and on the web 20, that is the adhesive is applied on the male tongue. In the example shown there are two beads on each surface. The amount of adhesive applied in the beads is selected so that it fills the gap between each of the three pairs of surfaces so that each surface is covered to the required thickness of the adhesive. The adhesive moves into place by compression between the pairs of surfaces and there is little or no shearing action in the adhesive as it approaches its required thickness because each pair of surfaces move together in a compressing action with little sliding action in the situation where the adhesive is compressed.

In FIG. 1, the rail 11 comprises a metal rail such as formed stainless steel or extruded aluminium, or a rail of another material such as pultruded fiber reinforced resin.

Figure 4:
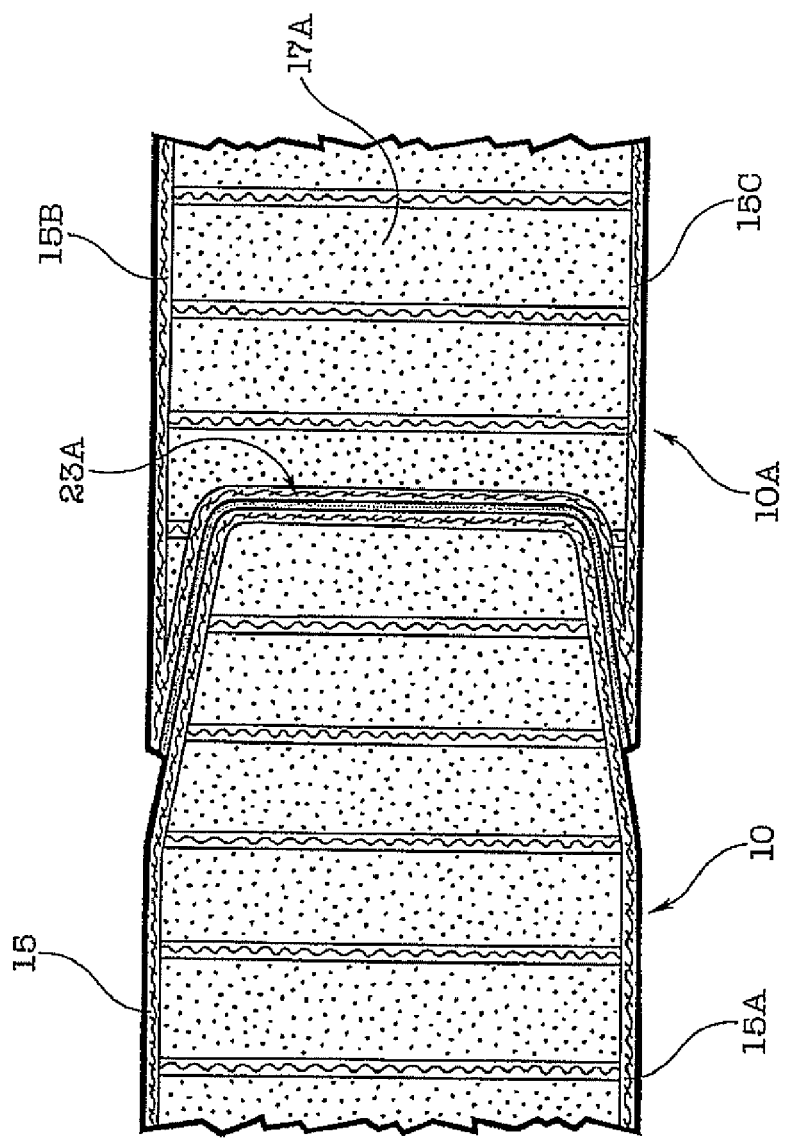
FIG. 4 is a cross sectional view on an enlarged scale showing the joint between a panel and a next adjacent panel.

In FIG. 4, the member comprises a second panel 10A formed by a resin infusion from a first fiber reinforced resin layer 15B at the first surface and a second fiber reinforced resin layer 15C at the second surface and containing therebetween a core material 17A and together defining an integral resin infused structure, the second panel having the channel 23A therein from a fiber reinforced resin layer.

The adhesive is arranged such that the adhesive releases its bond by heating to a release temperature such that the panel 10 can be separated from the rail 11 by heating the adhesive to its release temperature. This can be achieved by applying heating wires into the joint at one of the parts.

In FIG. 1, the panel 10 forms a panel of a body of a vehicle and in particular a floor panel, although the other panels of the vehicle body can be connected using the same joint structure. In this embodiment, the member 11 forms a stiffening rail of the body of the vehicle along the edge of the floor panel.

The adhesive selected is a adhesive with a cross-linking, reactive chemistry in which structural integrity of the adhesive is dependent on even distribution of the adhesive between the interfacing elements of the structure by means of compression. Such an adhesive can be catalyzed methyl methacrylate.

The angle of taper of each of the portions relative to the respective surface is not less than 10 degrees, making a total taper angle of 20 degrees. This angle provides sufficient spacing between the portions and the side surfaces such that they approach one another in the key spacing range of 0.1 to 0.03 inch by compression rather than by a shearing action in the adhesive.

In FIG. 1 is shown an alternative joint connection where a wall section 30 engages into the rail 11 which is connected at the junction between the wall section 30 and the floor panel 10. In this embodiment the wall portion 30 includes a flange 31 at its bottom end arranged longitudinally along the full length of the bottom edge of the wall section 30. Thus the flange 31 is arranged on the outside surface 32 of the panel 30 and forms an extension of the outer skin or outer layer 33. The rail 11 includes a web 34 and an interior flange 35. In this way in effect the rails 31 forms a Z-shaped connection with the corresponding edge of the panel 30. The web 34 is inclined at an angle different from 90° and extending so that the flanges 31 and 35 at the rail 11 are spaced apart in a direction parallel to the flanges. In this way the bottom edge of the panel 30 can be brought to the upper edge of the rail 11 and moved inwardly toward the interior of the vehicle thus acting in effect simultaneously to bring the flange 31 against the outside surface of the rail 11 and to bring the inside surface 36 of the panel into engagement with the flange 35 and in addition to bring the edge surface 37 of the panel into engagement with the web 34 of the rail 11. As these engagements are effected by an inward movement, adhesive located between these surfaces can be simultaneously compressed without the necessity for any sliding action such as may occur when an edge portion is inserted into a channel. In this way there is less necessity to provide accurate tolerances since there is a reduced tendency for adhesive to be wiped or swept away from the surfaces. Any additional adhesive is merely compressed and squeezed out. Any shortage of adhesive can be accommodated by the compression of adhesive from other areas.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A body for a vehicle comprising:
a wall panel;
a floor section comprising a horizontal floor panel and a horizontal side rail;
the horizontal floor panel extending across the floor section to an edge of the floor section;
the horizontal side rail being connected by a joint to the horizontal floor panel at the edge;
the wall panel being connected by a joint to the horizontal side rail and standing upwardly therefrom at the edge;
the horizontal floor panel having a first wall having an outer surface, a second wall having an outer surface and an end wall joining the first and second walls at one edge of the horizontal floor panel, the end wall having an outer surface;
each of the first, second walls and the end wall comprising a fiber reinforced resin;
the horizontal floor panel including a core material between the first and second walls and extending to the end wall at the edge of the panel;
a horizontal metal rail arranged at an edge of the floor section and connected by an adhesive to the horizontal panel along the end wall of the panel;
the horizontal panel being shaped so that the first and second walls include tapered portions at the edge of the panel which taper toward one another to the end wall such that a width of the end wall is less a distance between the first and second walls at positions thereon spaced from the tapered portions;
the metal rail comprising a channel which receives the edge of the horizontal panel;
the channel including a base of the channel attached to the end wall by a layer of the adhesive, a first side wall of the channel attached to the tapered portion of the first wall by a layer of the adhesive and a second side wall of the channel attached to the tapered portion of the second wall by a layer of the adhesive;
wherein the first and second side walls of the channel are tapered at an angle of taper equal to an angle of taper of the tapered portions of the first and second walls;
wherein the layers of adhesive between the base and the end wall, between the first wall and the first side wall and between the second wall and the second side wall each have a thickness not less than 0.03" (1 mm) or more than 0.10" (2.5 mm).

2. The body for a vehicle according to claim 1 wherein the adhesive is arranged such that the adhesive releases its bond by heating to a release temperature such that the panel can be separated from the member by heating the adhesive to its release temperature.

3. The body for a vehicle according to claim 1 wherein the adhesive is a adhesive with a cross-linking, reactive chemistry in which structural integrity of the adhesive is dependent on even distribution of the adhesive between the interfacing elements of the structure by means of compression.

4. The body for a vehicle according to claim 1 wherein the adhesive is catalyzed methyl methacrylate.

5. The body for a vehicle according to claim 1 wherein the angle of taper is not less than 10 degrees.

* * * * *